May 22, 1956 P. C. BOWSER 2,746,768
WHEEL HOP DAMPER ATTACHMENT FOR VEHICLE ROAD WHEELS
Filed Nov. 4, 1954 2 Sheets-Sheet 1

INVENTOR
Phillip C. Bowser
BY
Paul Fitzpatrick
ATTORNEY

May 22, 1956   P. C. BOWSER   2,746,768
WHEEL HOP DAMPER ATTACHMENT FOR VEHICLE ROAD WHEELS
Filed Nov. 4, 1954   2 Sheets-Sheet 2

INVENTOR
Phillip C. Bowser
BY
Paul Fitzpatrick
ATTORNEY

United States Patent Office 2,746,768
Patented May 22, 1956

2,746,768

WHEEL HOP DAMPER ATTACHMENT FOR VEHICLE ROAD WHEELS

Phillip C. Bowser, St. Clair Shores, Mich., assignor to General Motors Corporation, Detroit, Mich., a corporation of Delaware Application November 4, 1954, Serial No. 466,763

6 Claims. (Cl. 280—150)

This invention relates to vibration dampers and more particularly, although not exclusively, to inertia dampers adapted for installation adjacent to the road wheels of a vehicle to counteract high frequency, low amplitude wheel oscillation.

Dynamic wheel hop dampers or harmonic balancers are well known in the prior art. In this type of damper, a weight is slidably confined in a cylindrical member which is rigidly attached at a suitable point on the unsprung mass of the vehicle suspension. The weight is customarily centered intermediate the ends of the cylindrical member by suitable springs and is "tuned" to oscillate out of phase with the wheel hop resonance frequency. While this type of damper is highly effective, optimum efficiency depends, in large part, on the accuracy of finish of the cooperating parts. Consequently manufacture of such structures is relatively expensive.

An object of the present invention is to provide wheel hop dampers of simple and inexpensive construction.

Another object is to provide an inertia type wheel hop damper wherein a confined quantity of finely divided material is operative to absorb forces generated by wheel hop.

A further object is to provide an inertia type damper which may be mounted on an unsprung mass of a vehicle suspension at the point where maximum wheel hop amplitude occurs.

Still a further object is to provide a wheel hop damper, the fabrication of which requires minimum precision.

These and other objects and advantages of the invention will become more fully apparent as reference is had to the accompanying specification and drawings wherein.

Figure 1:
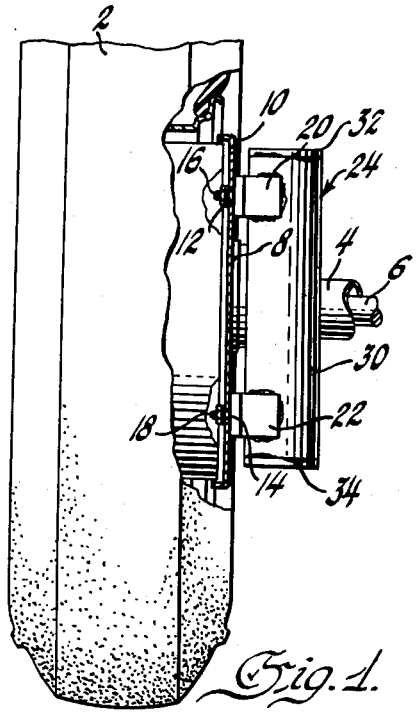
Fig. 1 is a fragmentary rear elevational view of the rear wheel of a vehicle showing the form and arrangement of the invention with reference thereto.
Figure 2:
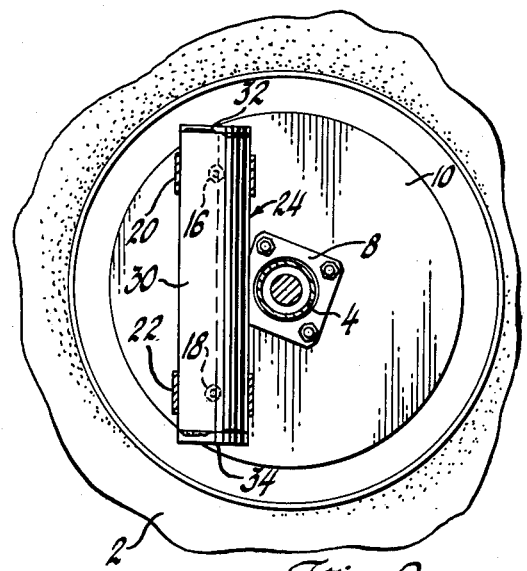
Fig. 2 is a fragmentary elevational view of the structure shown in Fig. 1.

Referring now to the drawings and particularly Figs. 1 and 2, there is illustrated a rear vehicle wheel 2 which is rotatably mounted at one end of a vehicle axle housing 4. A vehicle axle 6 extends out of housing 4 and is splined to wheel 2 to drivingly engage the latter in a conventional manner. Axle housing 4 is provided with a flange 8 to which is bolted a conventional brake backing plate 10. At one side of axle housing 4, backing plate 10 is provided with vertically aligned spaced apart apertures 12 and 14 which are adapted to receive attaching bolts 16 and 18. Bolts 16 and 18 are carried by spaced mounting brackets 20 and 22 which, in turn, are welded or otherwise connected to an inertia damper assembly 24. Upon insertion of bolts 16 and 18 in backing plate 10, nuts 26 and 28 are drawn up to secure the damper assembly 24 in rigid relation with backing plate 10.

Figure 3:
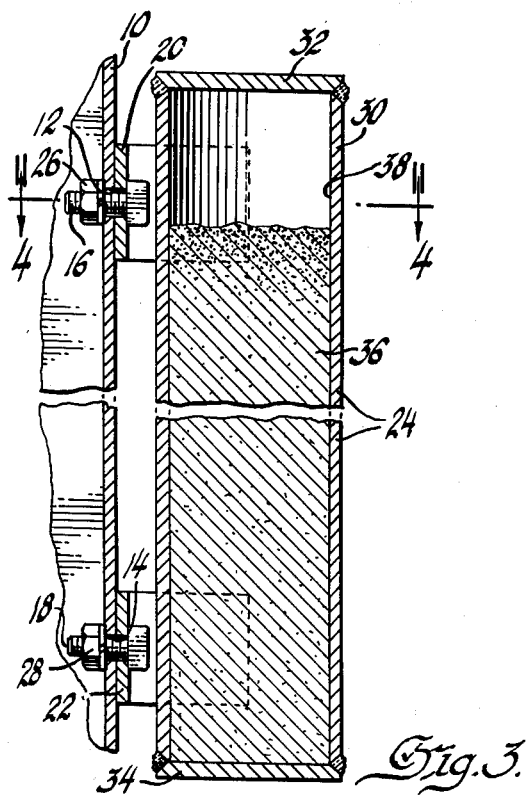
Fig. 3 is an enlarged fragmentary sectional view showing the internal construction of the invention.
Figure 4:
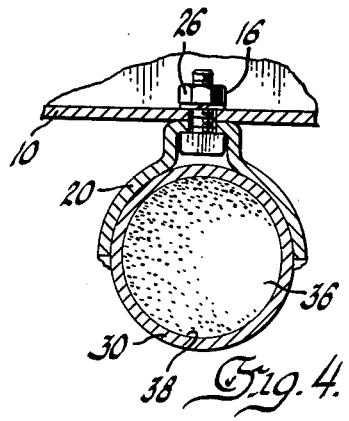
Fig. 4 is a top sectional view looking in the direction of arrows 4—4 of Fig. 3.

As seen best in Fig. 3, damper assembly 24 comprises a vertically extending tubular member 30, the opposite ends of which are closed by circular plates 32 and 34. Plates 32 and 34 may be secured thereon by any suitable means, such as welding. Confined interiorly of closed cylinder 30 is a quantity of finely divided or powdered particles 36. Powdered material 36 is preferably finely divided iron or other metallic fillings; however, it will be understood that any powdered material of sufficient density may be employed.

In operation, when the wheel 2 and cylinder 30 oscillate vertically or angularly at relatively high frequency, powdered material 36 tends to oscillate in the opposite direction, or out of phase with the frequency of wheel hop oscillation. The particles 36, therefore, necessarily move in a reverse direction relative to the cylinder wall 38. Consequently, movement of the particles up and down causes frictional drag between the particles 36 and the inner wall surface 38 of cylinder 30 as well as impact with the end caps 32 and 34. Hence, energy induced by embryonic wheel hop is transferred by frictional drag and impact of particles 36 and dissipated as heat. In addition, to some extent, oscillation of the wheel causes rubbing action between individual particles which further absorbs the energy of vibration and is ultimately dissipated as heat.

Figure 5:
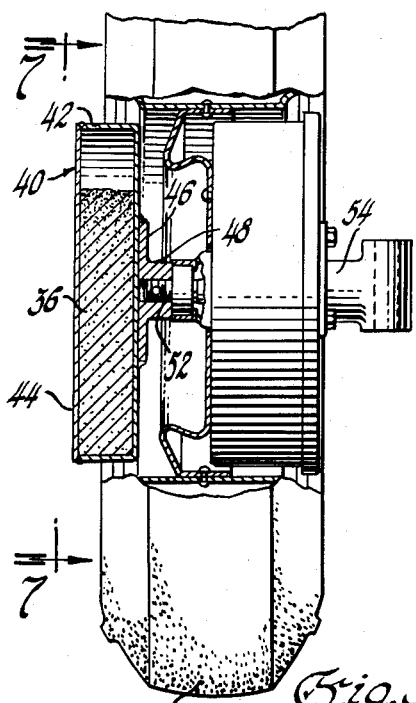
Fig. 5 is a fragmentary front elevational view showing a modified form of the invention, certain parts being broken away to more clearly reveal the construction thereof.
Figure 6:
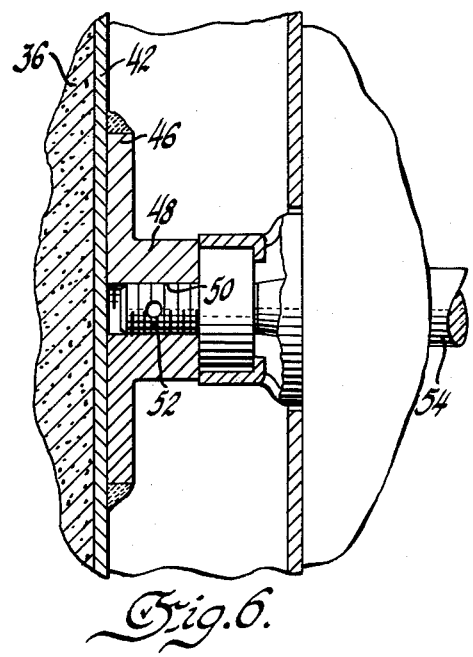
Fig. 6 is an enlarged fragmentary sectional view of a portion of the structure shown in Fig. 5.
Figure 7:
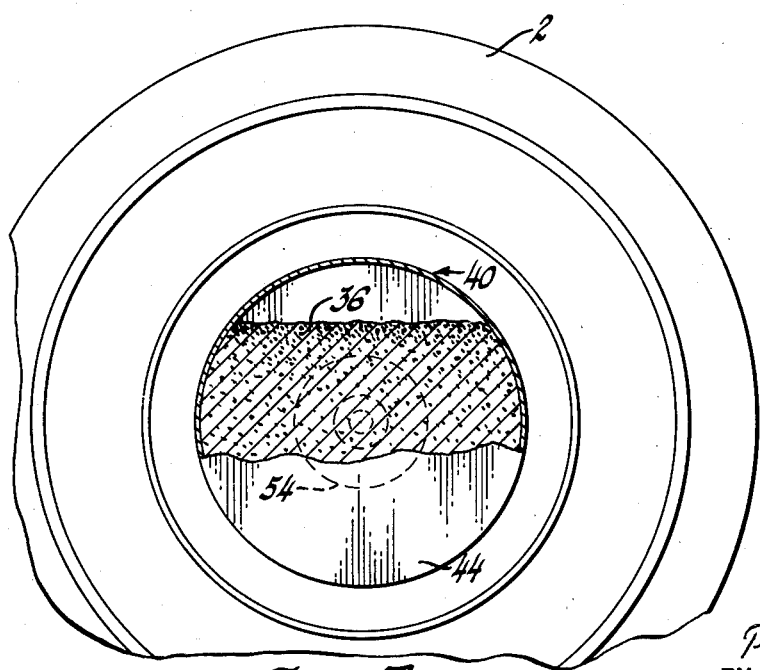
Fig. 7 is a fragmentary elevational view, partly in section, looking in the direction of arrows 7—7 of Fig. 5.

In the modification shown in Figs. 5 and 7, the particles 36 are confined in a relatively shallow drum-like container 40. Container 40 comprises a shallow dish portion 42 and a circular cover plate 44 which is welded over the open side of container 40. Container 40 is provided with a flanged connecting member 46 which is welded to the inner surface thereof in a position coaxial with the transverse centerline of the container. Connector 46 is provided with a reduced pilot portion 48 having an internal threaded bore 50. Threaded bore 50 is adapted for threadable engagement with the threaded outer end 52 of front wheel spindle 54. When mounted in the manner illustrated, the inertia damper assembly 40 occupies the outer-most position on wheel 2 and is thus disposed in the location of the maximum wheel hop amplitude. It will be apparent that wheel hop forces are most readily and effectively damped and counteracting forces applied where maximum wheel hop excitation occurs.

From the foregoing it will be seen that a novel and highly simplified inertia damper has been provided. The device is not only simple in construction but is admirably adapted for utilization in connection with the dirigible front wheels of a vehicle. In this connection, it is particularly important to note that the present invention does not in any sense interfere with or require redesign of the suspension elements or interfere with the normal operation thereof. Because of the simple and inexpensive construction involved, the present invention may be employed extensively on motor vehicles without appreciably increasing the cost of manufacture thereof. In addition, because of the granular character of the particles, containers of various shapes may be employed. Thus, for example, in the modified form shown in Fig. 5, the container may be contoured to conform substantially with the outer face of the wheels, or alternatively may be formed with an outer cover simulating the hub cap or wheel cover.

While the present invention has been described primarily in connection with the control of vertical oscillations of unsprung vehicle mass, it should be noted that the present construction is equally adaptable for use in other instances in connection with control of vibrations of the sprung mass, particularly with respect to operating conditions such as "body shake." In these instances, the device functions in a substantially identical manner to that described in connection with the vehicle wheel, but is attached rigidly to certain critical locations on the vehicle body or chassis.

While but two embodiments of the invention have been shown and described, it will be apparent that other changes and modifications may be made therein. It is, therefore, not intended to limit the invention to the embodiments shown but only by the scope of the claims which follow.

I claim:

1. In a motor vehicle having a road wheel mounted on a non-rotatable wheel spindle, a vibration damper comprising a drum-like hollow container, a bracket secured on one side of said container in alignment with the axis thereof, means for attaching said bracket to said spindle to secure said container in nesting relation with a side face of said wheel, and high density, granular means confined in said container and coacting with the walls thereof to resist wheel hop.

2. In a motor vehicle having a dirigible road wheel mounted on a non-rotatable wheel spindle, a vibration damper comprising a shallow drum-like hollow container, a bracket secured on one side of said container in alignment with the axis thereof, threadable means for attaching said bracket to said spindle to secure said container in nesting relation with a side face of said wheel, and high density, granular means confined in said container and coacting with the walls thereof to resist wheel hop.

3. In a motor vehicle having a dirigible road wheel mounted on a non-rotatable wheel spindle, a vibration damper comprising a shallow drum-like hollow container, a bracket secured on one side of said container in alignment with the axis thereof, threadable means for attaching said bracket to said spindle to secure said container in nesting relation with a side face of said wheel, and finely divided metal particles confined in said container and coacting with the walls thereof to resist wheel hop.

4. In a motor vehicle having a vertical movable non-rotatable wheel spindle, a wheel rotatably mounted on said spindle and vertically movable therewith, said wheel having a rim portion and an axially recessed load supporting portion, inertia type vibration damping means for said wheel, said damping means being disposed in concentric relation with said rim portion adjacent said axially recessed portion, and threadable means for securing said damper rigidly relative to said spindle.

5. In a motor vehicle having a vertical movable non-rotatable wheel spindle, a wheel rotatably mounted on said spindle and vertically movable therewith, said wheel having a rim portion and an axially recessed load supporting portion, inertia type vibration damping means for said wheel, said damping means comprising a relatively shallow drum-like container having finely divided particles confined therein adapted for coaction with said container to absorb vertical wheel oscillation forces, said damping means being disposed in concentric relation with said rim portion adjacent said axially recessed portion, and threadable means for securing said damper rigidly relative to said spindle.

6. In a motor vehicle, the combination of a road wheel bodily movable in a substantially vertical path, a vibration damper for said wheel, said damper comprising an elongated closed hollow cylindrical member disposed adjacent said wheel in generally parallel relation with the vertical path of movement thereof, means for attaching said cylindrical member adjacent said wheel for vertical movement therewith, and a quantity of finely divided particles confined interiorly of said cylindrical member, said particles being adapted to oscillate out of phase with said cylindrical member whereby wheel oscillation forces are resisted by coaction between the inner surface of said cylindrical member and said particles.

References Cited in the file of this patent
UNITED STATES PATENTS

| | | |
|---|---|---|
| 1,945,874 | Weaver | Feb. 6, 1934 |
| 2,195,041 | Von Schlippe | Mar. 26, 1940 |
| 2,417,347 | Brown | Mar. 11, 1947 |
| 2,469,167 | Little | May 3, 1949 |